(12) United States Patent
Ajitomi et al.

(10) Patent No.: US 11,336,449 B2
(45) Date of Patent: May 17, 2022

(54) INFORMATION PROCESSING APPARATUS, COMPUTER PROGRAM PRODUCT, AND RESOURCE PROVIDING METHOD

(71) Applicant: KABUSHIKI KAISHA TOSHIBA, Minato-ku (JP)

(72) Inventors: Daisuke Ajitomi, Setagaya (JP); Keisuke Minami, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 327 days.

(21) Appl. No.: 16/282,778

(22) Filed: Feb. 22, 2019

(65) Prior Publication Data
US 2020/0092101 A1    Mar. 19, 2020

(30) Foreign Application Priority Data
Sep. 13, 2018 (JP) .............................. JP2018-171240

(51) Int. Cl.
*H04L 9/32* (2006.01)
*H04L 29/06* (2006.01)

(52) U.S. Cl.
CPC .......... *H04L 9/3213* (2013.01); *H04L 9/3263* (2013.01); *H04L 63/102* (2013.01)

(58) Field of Classification Search
None
See application file for complete search history.

(56) References Cited

U.S. PATENT DOCUMENTS

2007/0255951 A1* 11/2007 Grynberg .............. H04L 9/3234
   713/168
2010/0250949 A1*  9/2010 Torino ................ H04L 63/0823
   713/176

(Continued)

FOREIGN PATENT DOCUMENTS

JP    2015-194879 A    11/2015
JP    2016-115260         6/2016
(Continued)

OTHER PUBLICATIONS

Workflow, RFC 7800, Proof-of-Possession Key Semantics for JSON Web Tokens (JWTs), https://datatracker.ietf.org/doc/rfc7800/, Retrieved Feb. 14, 2019, 11 pages.

(Continued)

*Primary Examiner* — Brandon Hoffman
(74) *Attorney, Agent, or Firm* — Oblon, McClelland, Maier & Neustadt, L.L.P.

(57) ABSTRACT

According to an embodiment, an information processing apparatus issues an access token in response to a token issuance request from a client. The information processing apparatus includes one or more processors configured to: receive the token issuance request from the client, the token issuance request including a nonce issued to the client, a first public key generated by the client, and a first signature for client information including the nonce; transmit, to the client, a login request including first identification information of the token issuance request, when the first signature of the token issuance request is successfully verified, using the first public key; and generate and issue a sender constrained token with the first public key as the access token, upon receipt of an authorization permission request from the client, the authorization permission request including the (Continued)

first identification information and authentication information of a user who uses the client.

10 Claims, 5 Drawing Sheets

(56) References Cited

U.S. PATENT DOCUMENTS

2016/0241403 A1* 8/2016 Lindemann ............. G06F 21/40
2016/0277413 A1  9/2016 Ajitomi et al.

FOREIGN PATENT DOCUMENTS

JP  2016-177795     10/2016
WO  WO 2005/011192 A1  2/2005

OTHER PUBLICATIONS

Workflow, OAuth 2.0 Proof-of-Possession: Authorization Server to Client Key Distribution, https://tools.ietf.org/html/draft-ietf-oauth-pop-key-distribution-04, Retrieved Feb. 14, 2019, 18 pages.
Workflow, The OAuth 2.0 Authorization Framework : JWT Pop Token Usage, https://tools.ietf.org/html/draft-sakimura-oauth-jpop-04, Retrieved Mar. 27, 2017, 14 pages.
Workflow, OAuth 2.0 Mutual TLS Client Authentication and Certificate Bound Access Tokens, https://tools.ietf.org/html/draft-ietf-oauth-mtls-12, Retrieved Feb. 14, 2019, 23 pages.
Workflow, Encoding claims in the OAuth 2 state parameter using a JWT, https://tools.ietf.org/html/draft-bradley-oauth-jwt-encoded-state-09, Retrieved Feb. 14, 2019, 9 pages.
Workflow, OAuth Security Topics, https://tools.ietf.org/html/draft-ietf-oauth-security-topics-11, Retrieved Feb. 14, 2019, 18 pages.

* cited by examiner

INFORMATION PROCESSING APPARATUS, COMPUTER PROGRAM PRODUCT, AND RESOURCE PROVIDING METHOD

CROSS-REFERENCE TO RELATED APPLICATIONS

This application is based upon and claims the benefit of priority from Japanese Patent Application No. 2018-171240, filed on Sep. 13, 2018; the entire contents of which are incorporated herein by reference.

FIELD

Embodiments described herein relate generally to an information processing apparatus, a computer program product, and a resource providing method.

BACKGROUND

In recent years, browser applications for allowing a client to implement a Web service have drawn attention. Use of a standard protocol OAuth2.0 (RFC 6749) for authentication between a client and a server in a system including such a browser application is known. OAuth2.0 defines an authorization flow as an implicit flow. The implicit flow refers to a flow for directly receiving an access token from an authorization server in response to an authorization request.

However, according to the protocol including the implicit flow, the type of access token issuable by the server is a bearer token, so that the leakage of an access token, if occurs, may lower security.

DETAILED DESCRIPTION

According to an embodiment, an information processing apparatus issues an access token in response to a token issuance request from a client. The information processing apparatus includes one or more processors configured to receive the token issuance request from the client, the token issuance request including a nonce issued to the client, a first public key generated by the client, and a first signature for client information including the nonce; transmit, to the client, a login request including first identification information of the token issuance request, when the first signature of the token issuance request is successfully verified, using the first public key; and generate and issue a sender constrained token with the first public key as the access token, upon receipt of an authorization permission request from the client, the authorization permission request including the first identification information and authentication information of a user who uses the client.

Hereinafter, an information processing apparatus, a computer program product, and a resource providing method will be described in detail with reference to the accompanying drawings.

First Embodiment

Figure 1:
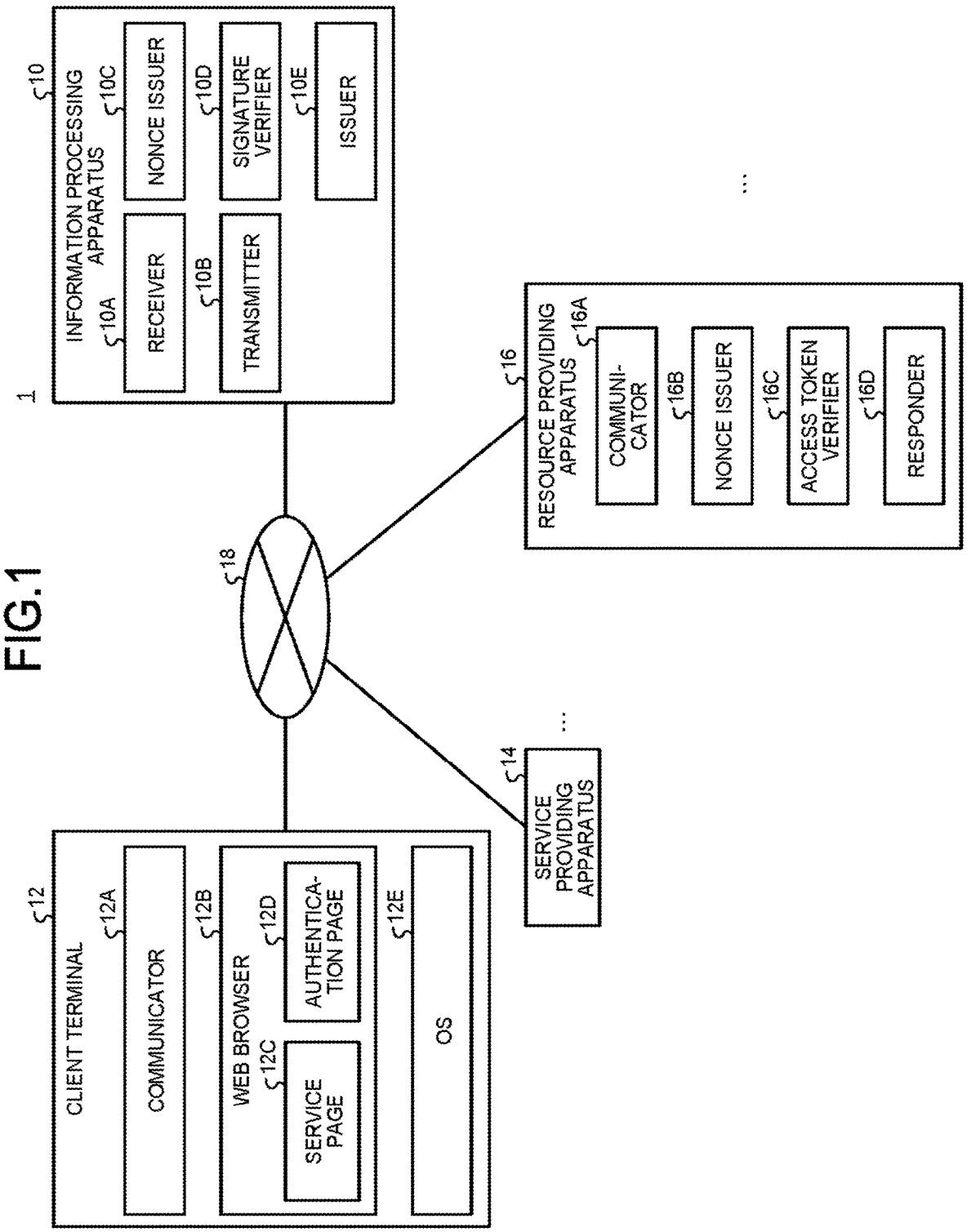
FIG. 1 is a schematic diagram of an information processing system.

FIG. 1 is a schematic diagram illustrating an exemplary information processing system 1 according to a first embodiment.

The information processing system 1 includes an information processing apparatus 10, a client terminal 12, a service providing apparatus 14, and a resource providing apparatus 16. The information processing apparatus 10, the client terminal 12, the service providing apparatus 14, and the resource providing apparatus 16 are connected through a network 18 to be able to communicate with each other. The information processing system 1 may include one or two or more client terminals 12, one or two or more service providing apparatuses 14, one or two or more resource providing apparatuses 16, and one or two or more information processing apparatuses 10.

The information processing apparatus 10 functions as an OAuth authorization server.

The client terminal 12 refers to a terminal device that is operated by a user. The client terminal 12 executes a client script with a Web browser 12B on the client terminal 12 and uses resources provided by the resource providing apparatus 16. The resources refer to, for example, a resource application for implementing a printing service or an online reporting service.

The service providing apparatus 14 refers to a client that is hosted on the Web and executed on the Web browser by OAuth.

The resource providing apparatus 16 refers to a resource server incorporating a client program that is hosted on the Web by OAuth. The resource providing apparatus 16 provides resources to the client terminal 12 in response to a resource request from the client terminal 12.

Next, the functional configuration of each apparatus of the information processing system 1 will be described in detail.

The client terminal 12 includes a communicator 12A, the Web browser 12B, and an operating System (OS) 12E. The communicator 12A performs data communication with the other apparatuses through the network 18.

In the client terminal 12, a central processing unit (CPU) executes the OS 12E stored in a read only memory (ROM) or an external memory to control each application. The OS 12E represents a general-purpose OS such as a real-time OS or Linux (registered trademark).

The Web browser 12B represents a user agent for using the World Wide Web (WWW). The Web browser 120 reads a service page 12C and an authentication page 120 from the service providing apparatus and the information processing apparatus, respectively, and executes the read pages.

The service page 12C refers to a page of a website provided from the service providing apparatus 14 and the substance of OAuth Client.

In the first embodiment, the service page 12C generates a pair of a first public key and a first private key for each client terminal 12 and for each origin being a combination of a protocol, a host, and a host number for identifying a Website provider (the service providing apparatus in the first embodiment). The pair of the first public key and the first private key may be generated by a known method. For example, the service page 12C generates the pair of the first public key and the first private key by W3C Web Cryptography API.

The service page 12C transmits a token issuance request to the information processing apparatus 10. The token issuance request corresponds to an OAuth2.0 authorization request. However, in the second embodiment, the token issuance request refers to an issuance request for a sender constrained token. The sender constrained token may be referred to as a proof-of-possession (PoP) token.

Specifically, in the first embodiment, the token issuance request includes a number used once (nonce) issued from the information processing apparatus 10 to the client terminal 12, the first public key, and a first signature for information including the nonce. The token issuance request includes information on the sender constrained token issuance request.

The nonce refers to a randomly generated number or character string and is used only once.

The service page 12C may acquire the nonce from the information processing apparatus 10 and transmit a token issuance request including the nonce to the information processing apparatus 10. The service page 12C may receive information indicating a storing location of the nonce from the information processing apparatus 10, and access the storing location to acquire the nonce.

The service page 12C appends a first signature to the acquired nonce, using the first private key. The first signature refers to a signature for the nonce or data containing client information such as the first public key together with the nonce. The first signature may be appended to the nonce using the first private key by a known method. A signature may be appended not to the nonce but to data containing client information such as the first public key together with the nonce.

The service page 12C receives access-token response information from the information processing apparatus 10 in response to the transmission of the token issuance request to the information processing apparatus 10.

The access-token response information includes specific information of an access token issued by the information processing apparatus 10. The specific access-token information may be any information for uniquely specifying the access token. The specific information represents, for example, the access token issued from the information processing apparatus 10 to the client terminal 12, information indicating the location where the access token is stored, or information for identifying the access token (third identification information). The first embodiment describes the access token as the specific information by way of example.

Receiving the access-token response information including the access token from the information processing apparatus 10, the service page 12C stores the access token in association with the first public key.

Then, the service page 12C transmits a resource request including the received access token to the resource providing apparatus 16. In the first embodiment, the service page 12C transmits a resource request including a nonce issued by the resource providing apparatus 16 and the received access token from the information processing apparatus 10, to the resource providing apparatus 16.

The resource providing apparatus 16 verifies the access token, and when successfully verifying the token, provides resources to the service page 12C.

The authentication page 12D refers to a web page to be displayed by the information processing apparatus 10, in response to the token issuance request from the service page 12C to the information processing apparatus 10. A login request specifically refers to a redirect request for the authentication page 12D. A redirect URL to the authentication page 12D includes first identification information of the token issuance request. The first identification information will be described in detail below.

As a result of the redirection from the information processing apparatus 10, the authentication page 12D is loaded on the Web browser 12B and displays an authentication screen for allowing the user to log in the information processing apparatus 10. The user inputs authentication information to the client terminal 12, referring to the authentication screen. The authentication information includes, for example, a user ID, a login password, and a session ID to issue after login authentication. The user ID refers to user identification information.

The authentication page 12D transmits, to the information processing apparatus 10, an authorization permission request including the authentication information (the user ID and the password) and the first identification information of the token issuance request.

Next, the functional configuration of the information processing apparatus 10 will be described.

The information processing apparatus 10 issues an access token in response to the token issuance request from the client. That is, the information processing apparatus 10 directly returns the access token to the client being the transmission source of the token issuance request, in response to the received token issuance request, as by the OAuth 2.0 implicit flow.

The client represents the client terminal 12 and the service page 12C loaded on the Web browser 12B installed in the client terminal 12. In the first embodiment, the client is referred to as the client terminal 12.

The information processing apparatus 10 includes a receiver 10A, a transmitter 10B, a nonce issuer 10C, a signature verifier 10D, and an issuer 10E.

The receiver 10A, the transmitter 10E, the nonce issuer 10C, the signature verifier 10D, and the issuer 10E may be implemented by software, that is, executing a program by a processor, such as a central processing unit (CPU). These elements may be implemented by hardware, that is, a processor, such as a dedicated integrated circuit (IC). These elements may be implemented by a combination of software and hardware. In use of multiple processors, each processor may implement one or two or more of these elements.

The receiver 10A receives various kinds of information from the client terminal 12, the service providing apparatus 14, and the resource providing apparatus 16. In the first embodiment, the receiver 10A receives the token issuance request including the nonce issued to the client terminal 12, the first public key generated by the client terminal 12, and the first signature for the nonce or data including client information, such as the first public key added to the nonce, from the client terminal 12. As described above, in the first embodiment, the token issuance request represents an issuance request for a sender constrained token.

The nonce issuer 10C issues a nonce to the client terminal 12. The nonce issuer 10C includes a random number generator to generate a random number, and issues the generated random number as the nonce to the client terminal 12.

The transmitter 10B transmits various kinds of information to the client terminal 12, the service providing apparatus 14, and the resource providing apparatus 16. In the first embodiment, the transmitter 10B transmits nonce information on the nonce to the service page 12C. The nonce information represents nonce, nonce identification information, or a nonce storing location. The first embodiment exemplifies the nonce issued by the nonce issuer 10C as the nonce information.

Upon receipt of the token issuance request including the first signature from the service page 12C, the signature verifier 10D verifies the first signature using the first public key. That is, the signature verifier 10D determines by the first public key whether the token issuance request has been signed with a private key corresponding to the first public key or whether data to be signed has been converted. The first signature may be verified by a known method.

When the first signature in the token issuance request, received from the service page 12C, is successfully verified by the first public key, the transmitter 10B transmits a login request to the authentication page 12D. The successful verification signifies that the signature verifier 10D has verified that data to be signed with the first signature has not been subjected to falsification and has been signed with a private key corresponding to the first public key.

The login request refers to a request for the user operating the client terminal 12 to urge an explicit operation for authorization. As described above, the login request includes the first identification information of the token issuance request. Specifically, the login request refers to a redirect response (for example, a 302 Found response), and a Location header value (URL) indicating a redirection destination includes the first identification information. For the sake of convenience, it is referred to as login request, however, the login request is an authorization request in practice and the authentication screen displays a screen to prompt the user to authorize access to resources on the resource providing apparatus from the service providing apparatus (client). If the user has already logged in at the time of redirection, a screen for requesting authorization is simply displayed without display of a login interface for inputting a login ID and a password.

The first identification information may be any identification information for associating the token issuance request including the first public key, the first signature, and the nonce, received from the service page 12C, with the authentication information (a user ID and a password or login session information after the user has logged in) received from the authentication page 12D. For example, the first identification information represents the nonce issued from the nonce issuer 10C to the client terminal 12, second identification information for identifying the nonce, or session identification information of the token issuance request received from the service page 12C.

When receiving from the client the authorization permission request including the authentication information of the user of the client and the first identification information, the issuer 10E generates a sender constrained token using the first public key and issues it as the access token to the client.

That is, the issuer 10E generates the sender constrained token using the first public key generated by the client terminal 12 and issues the access token to be usable only by the client terminal 12.

Then, the issuer 10E appends a second signature to the generated sender constrained token by a certificate for certifying the issuance of the access token to the issued access token by the information processing apparatus 10, and issues the access token with the second signature. The certificate can be a second public key generated in advance by the information processing apparatus 10.

The information processing apparatus 10 may generate a pair of the second public key and a second private key in advance. The pair of the second public key and the second private key may be generated by a known method.

The issuer 10E may append the second signature to a hash value of the generated sender constrained token and issue the access token with the second signature.

The issuer 10E stores the access token generated for the client terminal 12, the first public key used to identify the client terminal 12, the authentication information (a login ID and a password, or a session ID issued as a result of login) received from the client terminal 12 in association with one another. Then, the issuer 10E transmits access-token response information including the specific information of access token, which has been issued for the client terminal 12, to the service page 12C of the client terminal 12 through the transmitter 102.

Next, the functional configuration of the resource providing apparatus 16 will be described.

The resource providing apparatus 16 includes a communicator 16A, a nonce issuer 16B, an access token verifier 16C, and a responder 16D.

The communicator 16A, the nonce issuer 162, the access token verifier 16C, and the responder 16D may be implemented by software, i.e., by executing a program by a processor, such as a CPU. These elements may be implemented by hardware, i.e., a processor, such as a dedicated IC. These elements may be implemented by a combination of software and hardware. In use of multiple processors, each processor may implement one or two or more of these elements.

The communicator 16A communicates with the client terminal 12, the service providing apparatus 14, the resource providing apparatus 16, and the information processing apparatus 10 through the network 18.

The nonce issuer 16B issues a nonce. The nonce issuer 16B issues the nonce, as with the nonce issuer 10C of the information processing apparatus 10. However, the nonce issuer 16B is not in cooperation with the information processing apparatus 10, and issues a unique random number as the nonce.

Upon receipt of the resource request including the access token from the client terminal 12 through the communicator 16A, the access token verifier 16C verifies the access token. For example, the access token verifier 16C receives, through the communicator 16A, the resource request including the nonce issued by the nonce issuer 16B and the access token issued for the client terminal 12 by the information processing apparatus 10. Then, the access token verifier 16C inquires of the information processing apparatus 10 as to whether the access token in the resource request is the one issued to the client terminal 12 being the transmission source of the access token. Specifically, the access token verifier 16C transmits the access token to a token verification end point and determines whether the access token is valid. When the information processing apparatus 10 stores the access token and the authentication information of the client terminal 12 or the first public key in association with each other, and the validation of the token has not been expired and the token has not been revoked or invalidated, the resource providing apparatus 16 determines that the access token is the one issued to the client terminal 12 and the verification thereof has been successful.

When the access token verifier 16C determines the verification as successful, the responder 160 provides resources to the service page 12C.

Next, exemplary information processing performed by the information processing system 1 will be described.

Figure 2:
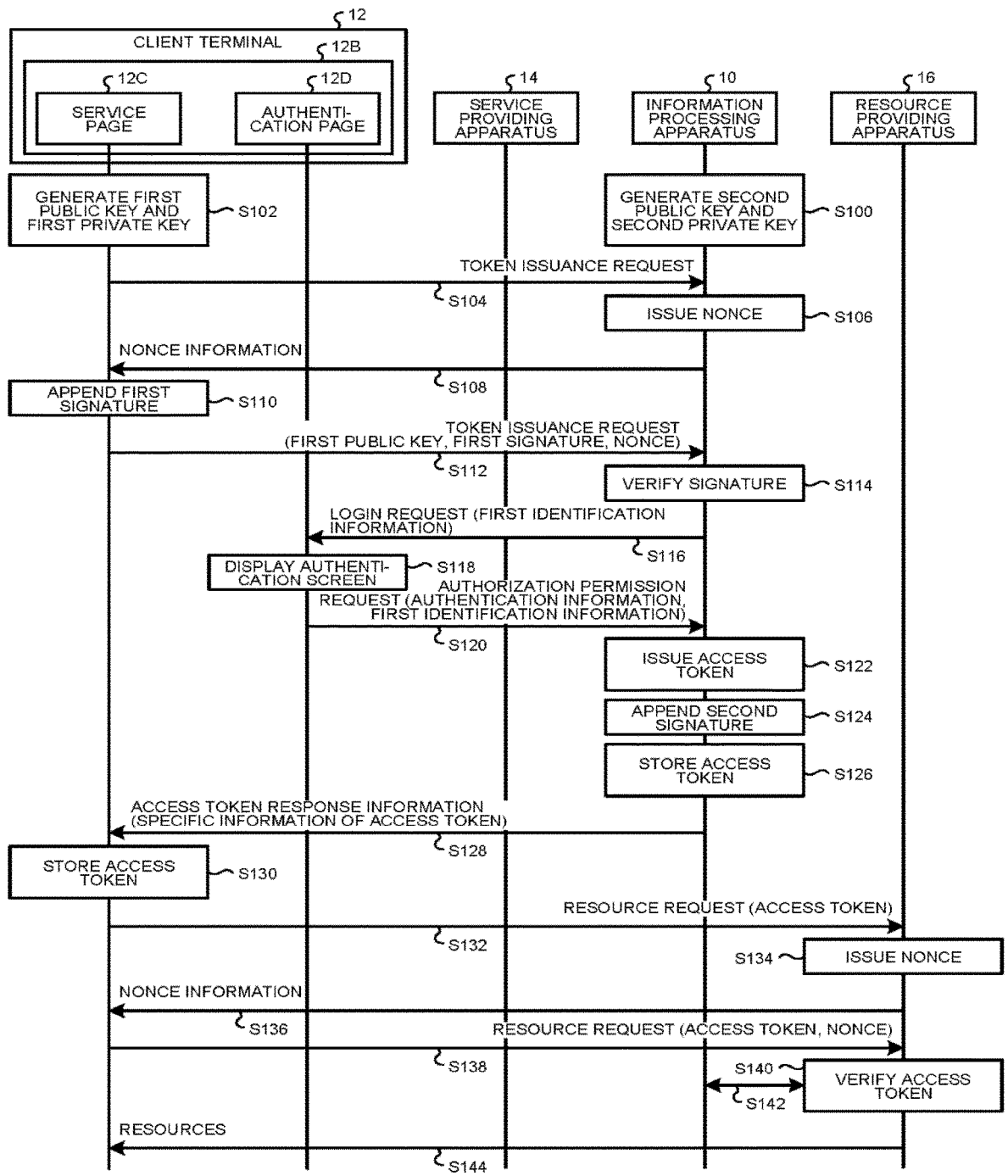
FIG. 2 is a sequence diagram of information processing.

FIG. 2 is a sequence diagram illustrating exemplary information processing performed by the information processing system 1

First, the information processing apparatus 10 generates a pair of the second public key and the second private key (Step S100). The service page 12C of the client terminal 12 generates a pair of the first public key and the first private key (Step S102).

Then, the service page 12C transmits a token issuance request to the information processing apparatus 10 (Step S104). In the first embodiment, the service page 12C transmits to the information processing apparatus 10 a token issuance request, that is, an issuance request for a sender constrained token. The token issuance request in Step S104 is expressed by, for example, "POST/authorize?response_type=token&client_id=x&token_type=pop&redirect_uri=https://rp.example.com/cb".

Receiving the token issuance request from the service page 12C in Step S104, the nonce issuer 10C of the information processing apparatus 10 issues a nonce to the client terminal 12 (Step S106).

The nonce issuer 10C transmits nonce information on the nonce issued in Step S106 to the service page 12C through the transmitter 10B (Step S108). Specifically, the nonce issuer 10C transmits a "401 Unauthorizednonce" response containing the nonce at the header, to the service page 12C.

The nonce information may be any information representing the nonce issued in Step S106. Specifically, the nonce information represents information including the nonce, nonce identification information, or a nonce storing location. The first embodiment illustrates the nonce as an example of the nonce information.

The service page 12C of the client terminal 12 appends the first signature to the nonce, received from the information processing apparatus 10, using the first private key (Step S110). The signature does not need to be appended only to the nonce and may be appended to data including client information such as the first public key.

Then, the service page 12C of the client terminal 12 transmits a token issuance request including the first public key, the nonce received in Step S108, and the first signature appended in Step S110 to the information processing apparatus 10 (Step S112).

The token issuance request transmitted in Step S112 is expressed by, for example, "POST/authorize?response_type=token&client_id=x&token_type=pop&alg=RS256&key=KRpub&redirect_uri=https://rp.example.com/cb" where RS256 represents the first signature, KRpub represents the first public key, and pop represents the issuance request for a sender constrained token.

The signature verifier 100 of the information processing apparatus 10 verifies the first signature in the token issuance request, received from the authentication page 12D of the client terminal 12 in Step S112, using the first public key in the token issuance request (Step S114). It is assumed that the verification be successful for the sake of explanation.

The transmitter 100 of the information processing apparatus 10 transmits a login request including the first identification information to the authentication page 12D of the client terminal 12 (Step S116). In Step S116, the transmitter 100 transmits any of the nonce issued in Step S106, the second identification information of the nonce, and the communication session identification information of at least one of the token issuance requests received in Steps S104 and S112 as the first identification information.

The login request is represented as, for example, a "302 Found" response, that is, a redirect response. A Location header includes the URL of the authorization screen.

Receiving the login request, the authentication page 12D of the client terminal 12 displays an authentication screen for allowing the user to log in the information processing apparatus 10 (Step S118). The user inputs authentication information including a user ID and a password to the client terminal 12, referring to the authentication screen. As described above, when the user has already logged in, the input of the authentication information is skipped and the authentication screen displays only an interface for prompting the authorization of access from the service providing apparatus to the resources of the resource providing apparatus. The OAuth authorization screen is generally provided with such an interface.

The authentication page 12D of the client terminal 12 transmits, to the information processing apparatus 10, an authorization permission request including the input authentication information (the user ID, the password, or the session ID issued after authentication), and the first identification information in the login request received in Step 3116 (Step S120).

The authorization permission request is expressed by, for example, "POST/grant".

When receiving the authorization permission request, the issuer 10E of the information processing apparatus 10 determines whether or not the authentication information in the authorization permission request matches the one registered in advance in the information processing apparatus 10 to thereby determine whether to permit the user operating the client terminal 12 to log in the information processing apparatus 10. It is assumed that the login be permitted for the sake of explanation.

The issuer 10E of the information processing apparatus 10 generates a sender constrained token using the first public key included in the token issuance request received in Step S112, and issues an access token to the client terminal 12 (Step S122).

Then, the issuer 10E appends the second signature to the access token issued in Step S122, using the second private key generated in Step S100 (Step S124).

The issuer 10E stores the access token issued for the client terminal 12, the first public key used to identify the client terminal 12, and the authentication information (the login ID and the password) received from the client terminal 12 in association with one another (Step S126).

The transmitter 103 of the information processing apparatus 10 transmits access-token response information including the access token with the second signature, issued in Step S122 and Step S124, to the client terminal 12 (Step S128).

The access-token response information represents, for example, a "302 Found" redirect response, and the value of the location header is expressed by https://rp.example.com/cb#access_token-PoPToken where rp.example.com represents the host of the service providing apparatus 14 and PoPToken represents the access token with the second signature.

The service page 12C of the client terminal 12 stores the first public key and the access token specified by the specific access token information contained in the access-token response information received in Step S128, in association with each other (Step S150). The access token stored in Step S130 has been issued by the information processing apparatus 10 in Step S122 and appended with the second signature in Step S124.

Then, the service page 125 of the client terminal 12 transmits a resource request including the access token with the second signature stored in Step S130 to the resource providing apparatus 16 (Step S132).

The resource request in Step S132 is expressed by, for example, "GET/some-resource".

Receiving the resource request in Step S132, the nonce issuer 165 of the resource providing apparatus 16 issues nonce for the client terminal 12 (Step S134). Then, the nonce issuer 165 transmits nonce information including the nonce issued in Step S134 to the client terminal 12 (Step S136). The nonce information in Step 2136 is set at, for example, the header of a "401 Unauthorized" error response. The first embodiment describes an example that the nonce issuer 165 transmits the nonce to the client terminal 12.

Receiving the nonce in Step S136, the service page 120 of the client terminal 12 transmits a resource request including the access token with the second signature stored in Step S130 and the nonce received in Step S136 to the resource providing apparatus 16 (Step S138).

The resource request in Step S138 is, for example, expressed by "GET/some-resource". The access token with the signature and the nonce are designated in an Authorization header and are expressed by, for example, "Authorization: Jpop at="JWS", s="nonce"". JWS represents the access token with the signature.

The access token verifier 16C of the resource providing apparatus 16 verifies the access token with the second signature in the resource request received in Step 3138 (Step S140 and Step S142). The access token verifier 16C inquires of the information processing apparatus 10 as to whether the information processing apparatus 10 has issued the access token certified by the second signature, to verify the access token. It is assumed that that the verification be determined to be successful for the sake of explanation.

Then, the responder 16D of the resource providing apparatus 16 provides the service page 12C with resources (Step S144). For example, the responder 16D transmits "200 OK" to the service page 12C.

As described above, the information processing apparatus 10 according to the first embodiment issues the access token in response to the token issuance request from the client. The information processing apparatus 10 includes the receiver 10A, the transmitter 108, and the issuer 10E. The receiver 10A receives the token issuance request including the nonce issued to the client, the first public key generated by the client, and the first signature for information including the nonce. When the verification of the first signature in the token issuance request by the first public key is successful, the transmitter 10B transmits the login request including the first identification information of the token issuance request to the client. Upon receipt of the authorization permission request including the first identification information and the authentication information of the user of the client from the client, the issuer 10B generates a sender constrained token using the first public key and issues it as the access token.

As such, the information processing apparatus 10 according to the first embodiment issues the access token in response to the token issuance request from the client. Thus, the information processing apparatus 10 executes an authorization flow along the implicit flow defined by OAuth2.0. However, upon receiving the authorization permission request including the authentication information of the client and the first identification information, the information processing apparatus 10 generates a sender constrained token using the first public key generated by the client and issues the sender constrained token as the access token.

That is, the information processing apparatus 10 according to the first embodiment generates the sender constrained token to be usable only by the client to issue a secure access token.

As a result, the information processing apparatus 10 according to first embodiment can improve the security of the access token.

The information processing apparatus 10 according to the first embodiment issues the access token in response to the first token issuance request from the client. That is, the information processing apparatus 10 performs an authorization flow along the implicit flow defined by OAuth2.0. Thus, the information processing apparatus 10 can issue, to the client terminal 12, an access token for access to resources by a simple communication method.

Second Embodiment

A second embodiment will describe an example that the resource providing apparatus performs at least one of the generation of an access token and the appending of a signature to the access token.

Figure 3:
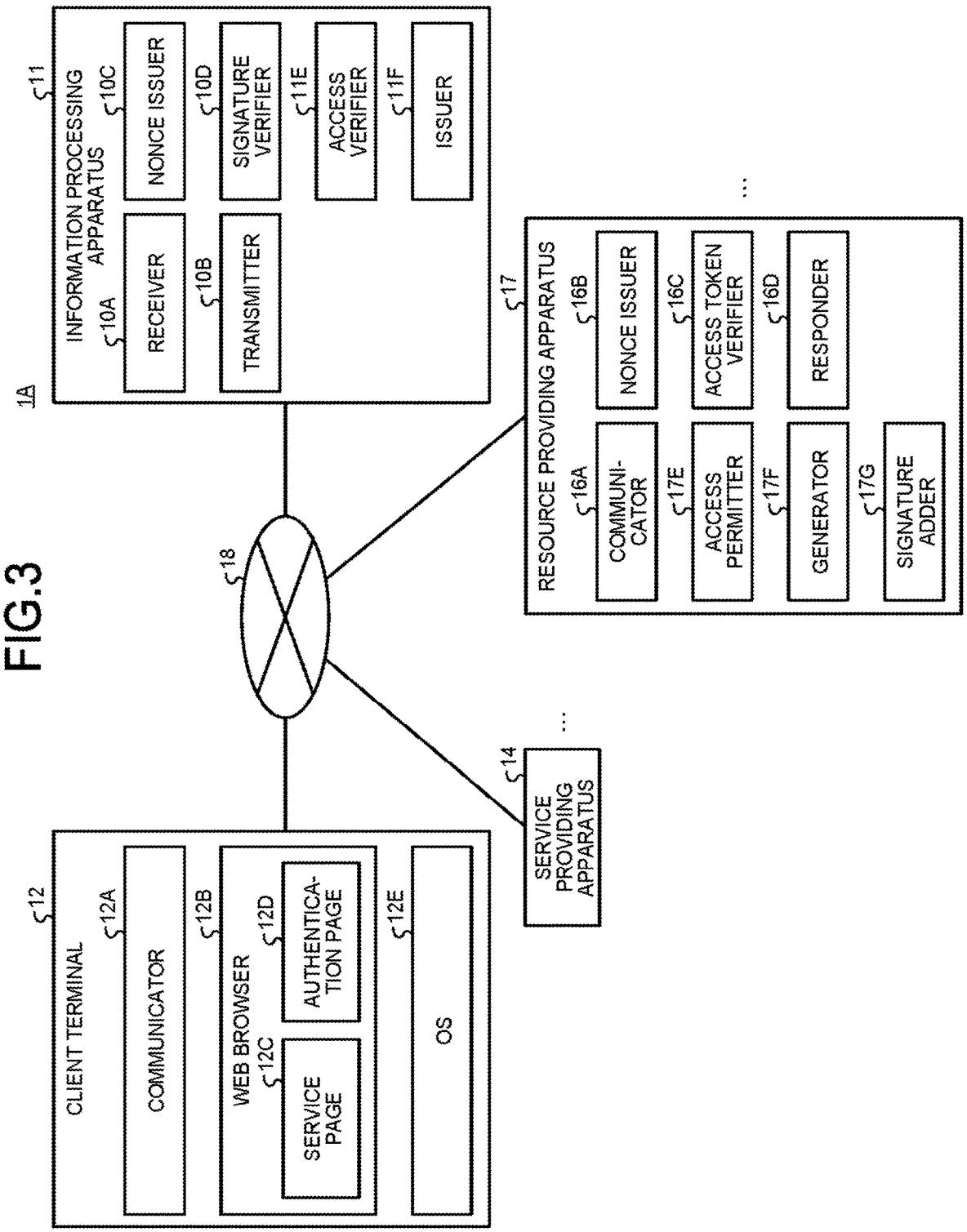
FIG. 3 is a schematic diagram of an information processing system.

FIG. 3 is a schematic diagram illustrating an exemplary information processing system 1A according to the second embodiment. The same functions and configurations as those in the first embodiment are denoted by the same reference numerals and the detailed description thereof will be omitted.

The information processing system 1A includes an information processing apparatus 11, a client terminal 12, a service providing apparatus 14, and a resource providing apparatus 17. The client terminal 12 and the service providing apparatus 14 are identical to those in the first embodiment. The information processing apparatus 11, the client terminal 12, the service providing apparatus 14, and the resource providing apparatus 17 are connected through a network 18 to be able to communicate with one another. The information processing system 1A may include one or two or more client terminals 12, one or two or more service providing apparatuses 14, one or two or more resource providing apparatuses 17, and one or two or more information processing apparatuses 11.

As with the information processing apparatus according to the first embodiment, the information processing apparatus 11 represents a server for implementing OAuth and functions as an authorization server. As with the information processing apparatus 10 according to the first embodiment, the information processing apparatus 11 issues an access token, in response to a token issuance request from a client. That is, the information processing apparatus 11 directly returns the access token to the client being the transmission source of the token issuance request, in response to the received token issuance request, as by the OAuth 2.0 implicit flow.

The information processing apparatus 11 includes a receiver 10A, a transmitter 10E, a nonce issuer 10C, a signature verifier 10D, an access verifier 11E, and an issuer 11F. The receiver 10A, the transmitter 10B, the nonce issuer 10C, and the signature verifier 10D are identical to those in the first embodiment.

When receiving a token issuance request including third identification information of the resource providing apparatus 17 that the client terminal 12 requests to provide resources, the access verifier 11E determines whether the client being the transmission source of the token issuance request has a right to access the resource providing apparatus 17 identified by the third identification information.

Specifically, in the second embodiment, the receiver 10A receives a token issuance request including a first public key generated by the client terminal 12, a first signature appended by the client terminal 12, a nonce issued from the information processing apparatus 11 to the client terminal 12, and the third identification information.

The third identification information refers to the identification information of the resource providing apparatus 17 that receives the resource providing request from the client terminal 12. In other words, the third identification information is for identifying the resource providing apparatus 17 that the client terminal 12 requests to provide resources.

The access verifier 11E may pre-store, for each resource providing apparatus 17 of the information processing system 1A, the identification information of the client terminal 12 to be permitted to access resources. The identification information of the client terminal 12 can be, for example, the first public key generated by the client terminal 1' That is, the access verifier 11E stores the third identification information of the resource providing apparatus 17 and the first public key generated by the client terminal 12 that the resource providing apparatus 17 identified by the third identification information has permitted access, in association with each other. When the first public key and the third identification information contained in the token issuance request are stored in association with each other, the access verifier 11E determines that the client terminal 12 has an access right.

When access verifier 11E determines that the client terminal 12 has an access right, the issuer 11F issues an access token to be usable by the resource providing apparatus 17 identified by the third identification information.

The issuer 11F may request the resource providing apparatus 17 to issue the access token. The second embodiment describes the example that the resource providing apparatus 17 issues the access token and appends a signature.

In issuing the access token, for example, the issuer 11F transmits an access permission request from the client (client terminal 12), being the transmission source of the token issuance request, to the resource providing apparatus 17 identified by the third identification information in the token issuance request received from the client terminal 12. Upon receiving the access permission request, the resource providing apparatus 17 permits the client terminal 12 to access. However, the resource providing apparatus 17 has not permitted to provide resources to the client terminal 12.

When the access verifier 11E determines that the client terminal 12 has an access right, the issuer 11F requests the resource providing apparatus 17, identified by the third identification information in the token issuance request received from the client terminal 12, to generate a sender constrained token using the first public key generated by the client terminal 12. For example, the issuer 11F transmits, to the resource providing apparatus 17, an access token generation request including the first public key that is included in the token issuance request received from the client terminal 12.

The issuer ilk requests the resource providing apparatus 17, identified by the third identification information included in the token issuance request received from the client terminal 12, to append a third signature to the sender constrained token using a certificate for certifying the issuance of the access token by the resource providing apparatus 17. For example, the issuer 11F transmits a signature appending request to the resource providing apparatus 17.

Then, the issuer lip may receive the sender constrained token (access token) to which the third signature has been appended from the resource providing apparatus 17 and issue the access token.

The issuer 11k may generate the access token and request the resource providing apparatus 17 to only append the signature.

Next, the functions of the resource providing apparatus 17 will be described.

The resource providing apparatus/includes communicator 16A, a nonce issuer 16B, an access token verifier 16C, a responder 16D, an access permitter 17E, a generator 17F, and a signature adder 17G. The communicator 16A, the nonce issuer 16E, the access token verifier 16C, and the responder 16D are identical to those of the resource providing apparatus 16 according to the first embodiment.

When receiving an access permission request from the information processing apparatus 11, the access permitter 17E stores the identification information of the client terminal 12 included in the access permission request as the identification information of the client to be permitted to access resources. The identification information of the client terminal 12 can be, for example, the authentication information (a user ID and a password) of the user operating the client terminal 12, identification information for uniquely identifying the client terminal 12, or the first public key generated by the client terminal 12.

The access permitter 17E permits the access of the client terminal 12 through this storing process. The permission of access signifies that the client terminal 12 is not permitted to be provided with resources but is permitted to access only.

When receiving an access token generation request including the first public key of the client terminal 12 from the information processing apparatus 1, the generator 17F generates a sender constrained token (access token) for the client terminal 12 using the first public key.

When receiving a signature appending request from the information processing apparatus 11, the signature adder 17G appends the third signature to the sender constrained token (access token) generated by the generator 17F, by a certificate for certify ing the issuance of the access token by the resource providing apparatus 17. The certificate can be a third private key generated in advance by the resource providing apparatus 17.

The resource providing apparatus 17 may generate a pair of the third public key and a third private key in advance. The pair of the third public key and the third private key may be generated by a known method. The signature adder 17G may append the third signature to the access token, using the third private key generated in advance.

The signature adder 17G may generate an access token with the third signature by appending the third signature to a hash value of the sender constrained token generated by the generator 17F.

Next, exemplary information processing performed by the information processing system 1A will be described.

Figure 4:
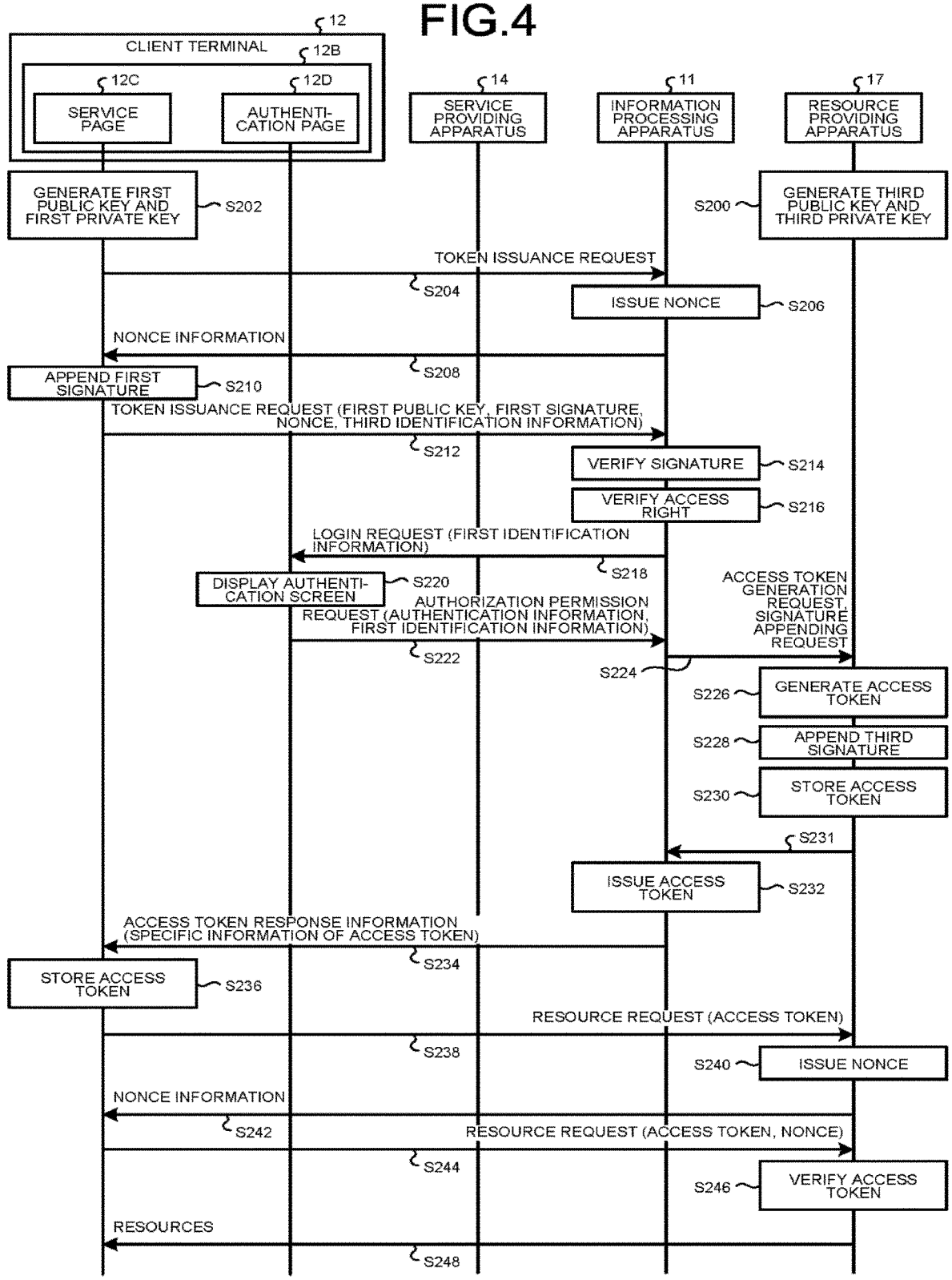
FIG. 4 is a sequence diagram of information processing.

FIG. 4 is a sequence diagram illustrating an exemplary information processing performed by the information processing system 1A.

First, the resource providing apparatus 17 generates a pair of the third public key and the third private key (Step S200). The service page 12C of the client terminal 12 generates a pair of the first public key and the first private key (Step S202).

Then, the service page 12C of the client terminal 12 transmits a token issuance request to the information processing apparatus 11 (Step S204). In the second embodiment, the service page 12C transmits an issuance request for a sender constrained token to the information processing apparatus 11.

Upon receipt of the token issuance request from the service page 12C in Step S204, the nonce issuer 10C of the information processing apparatus 11 issues a nonce to the client terminal 12 (Step S206). Then, the nonce issuer 10C transmits nonce information on the nonce issued in Step S206 to the service page 12C through the transmitter 10B (Step S208). The nonce information may be any information representing the nonce issued in Step S206. The second embodiment describes the nonce as an example of the nonce information.

The service page 12C of the client terminal 12 appends a first signature to the nonce received from the information processing apparatus 11, using the first private key (Step S210).

The operation in Steps S202 to S210 is the same as that in Steps S102 to S110 according to the first embodiment (see FIG. 2).

The service page 12C of the client terminal 12 transmits, to the information processing apparatus 11, a token issuance request including the first public key, the nonce received in Step S208, and the first signature appended in Step S210, and the third identification information of the resource providing apparatus 17 that the client terminal 12 requests to provide resources (Step S212).

That is, in the second embodiment, the operation in Step S212 differs from the operation in Step S112 in that the service page 12C transmits the token issuance request additionally including the third identification information to the information processing apparatus 10 (see FIG. 2).

The service page 12C of the client terminal 12 displays information representing a list of multiple resource providing apparatuses 17 connected to the information processing system 1A. The user operates the client terminal 12 to select a resource providing apparatus 17 to issue a request for providing resources. Through the selection, the service page 12C receives the third identification information of the resource providing apparatus 17 which is requested to provide resources. The service page 12C transmits the token issuance request including the third identification information to the information processing apparatus 11.

Upon receipt of the token issuance request including the first signature from the authentication page 120 of the client terminal 12 in Step S212, the signature verifier 100 of the information processing apparatus 11 verifies the first signature using the first public key included in the token issuance request. (Step S214). The operation in Step 3214 is the same as that in Step S114 (see FIG. according to the first embodiment. It is assumed that the verification be successful for the sake of explanation.

The access verifier 115 of the information processing apparatus 11 determines whether the client terminal 12 being the transmission source of the token issuance request in Step S212 has a right to access the resource providing apparatus 17 identified by the third identification information (Step S216). It is assumed that that the client terminal 12 be determined to have the access right.

Upon confirming that the client terminal 12 has the access right, the transmitter 108 of the information processing apparatus 11 transmits a login request including the first identification information to the authentication page 129 of the client terminal 12 (Step S218). In Step S218, the transmitter 108 transmits any of the nonce issued in Step S206, the second identification information of the nonce, and the communication session identification information of at least one of the token issuance requests received in Steps S204 and S212, as the first identification information.

Having received the login request, the authentication page 12D of the client terminal 12 displays an authentication screen for allowing the user to log in the information processing apparatus 11 (Step S220). The user inputs authentication information (a user ID and a password) to the client terminal 12, referring to the authentication screen.

The authentication page 129 of the client terminal 12 transmits an authorization permission request including the authentication information (the user ID and the password) and the first identification information included in the login request received in Step 3218, to the information processing apparatus 11 (Step 3222).

The operation in Steps S216 to S222 is the same as the operation in Steps S116 to S120 in the first embodiment (see FIG. 2).

Upon receipt of the token issuance request including the first public key from the client terminal 12 in Step S212, the issuer 11F of the information processing apparatus 11 transmits an access token generation request including the first public key and a signature appending request to the resource providing apparatus 17 (Step S224). Assuming that the resource providing apparatus be a device on a private network such as a home network, in general, the information processing apparatus 11 may not be able to normally access the resource providing apparatus 17 due to the influence of a firewall, for example. For this reason, the resource providing apparatus 17 may constantly establish a communication channel with the information processing apparatus 11 using power-ON as a trigger, by a normally connected communication protocol such as WebSocket, to issue the access token generation request through the WebSocket connection. Alternatively, prior to the token issuance request (Step S204), the service page 120 (OAuth client) loaded on the Web browser may try to access the intended resource providing apparatus 17. At this point the service page 12C does not have an access token, therefore, the resource providing apparatus 17 may be redirected to an authorization end point (/authorize) of the information processing apparatus to establish WebSocket connection ng the access attempt as a trigger and receive the access token generation request.

The generator 17F of the resource providing apparatus 17 generates a sender constrained token (access token) for the client terminal 12, using the first public key included in the access token generation request received in Step S224 (Step S226).

Then, the signature adder 17G of the resource providing apparatus 17 appends the third signature to the sender constrained token (access token) generated in Step S226, using the third private key generated in Step S200 (Step S228).

The signature adder 170 stores the generated access token and the first public key included in the access token generation request received in Step S224 in association with each other (Step S230).

The communicator 16A of the resource providing apparatus 17 transmits the access token with the third signature generated in Steps S226 and S228 to the information processing apparatus 11 (Step S231). Upon receiving the access token with the third signature from the resource providing apparatus 17, the issuer ilk of the information processing apparatus 11 issues the access token (Step S232).

As described above, the issuer 115 of the information processing apparatus 11 may generate the sender constrained token to issue the access token. The information processing apparatus 11 may request the resource providing apparatus 17 to append the third signature.

The transmitter 10B of the information processing apparatus 11 transmits access-token response information including the access token with the third signature received in Step S232 to the client terminal 12 (Step S234).

Upon receipt of the access-token response information in Step 3234, the service page 120 of the client terminal 12 stores the first public key and the access token included therein in association with each other (Step S236). The access token stored in Step S236 has been generated by the information processing apparatus 11 or the resource providing apparatus 17 and appended with the third signature by the resource providing apparatus 17.

Next, the service page 120 of the client terminal 12 transmits a resource request including the access token with the third signature stored in Step S236 to the resource providing apparatus 17 identified by the third identification information (Step S238).

Having received the resource request in Step S238, the nonce issuer 165 of the resource providing apparatus 17 issues a nonce for the client terminal 12 (Step S240). The nonce issuer 165 transmits once information on the nonce issued in Step S240 to the client terminal 12 (Step S242). The second embodiment describes the example that the nonce issuer 165 transmits the nonce to the client terminal 12.

Having received the nonce in Step S242, the service page 12C of the client terminal 12 transmits a resource request including the access token with the third signature stored in Step S236 and the nonce received in Step S242 to the resource providing apparatus 17 identified by the third identification information (Step S244).

The operation in Steps S234 to S244 is the same as the operation in Steps S128 to S138 in the first embodiment (see FIG. 2).

The access token verifier 16C of the resource providing apparatus 17 verifies the access token with the third signature included in the resource request received in Step 3244 (Step 3246). The access token verifier 16C verifies the access token with the third signature by determining whether it has been stored in Step S230. That is, in the second embodiment, the access token verifier 16C verifies the access token without inquiring of the information processing apparatus 11. It is assumed that that verification be successful.

The responder 162 of the resource providing apparatus 17 provides resources to the service page 12C of the client terminal 12 (Step S248).

As described above, when receiving a token issuance request additionally including the third identification information of the resource providing apparatus 17 which is requested to provide resources, the information processing apparatus 11 according to the second embodiment issues an access token to be usable by the resource providing apparatus 17 identified by the third identification information. That is, the information processing apparatus 11 issues the access token being a sender constrained token to be usable only by the client terminal 12 which has transmitted the token issuance request, and the resource providing apparatus 17 which the client terminal 12 requests to provide resources.

Thus, the information processing apparatus 1 according to the second embodiment can further limit the usage of the access token and further improve the security of the access token, in addition to the effects of the first embodiment.

Further, the information processing apparatus 11 according to the second embodiment transmits the access permission request from the client terminal 12, being the transmission source of the token issuance request, to the resource providing apparatus 17 identified by the third identification information included in the token issuance request. In response to the access permission request, the resource providing apparatus 17 permits the client terminal 12 indicated by the access permission request to access. Thus, the information processing apparatus 11 can control the resource providing apparatus 17 to selectively permit the access of client terminal 12.

Thus, the information processing apparatus 11 according to the second embodiment can further improve the security of the access token, in addition to the above effects.

Further, in the second embodiment, the resource providing apparatus 17, which receives a request for providing resources from the client terminal 12, appends the third signature to the access token. Thus, in the second embodiment, the access token issued to the client terminal 12 is appended with the third signature by the resource providing apparatus 17.

That is, in the second embodiment, the resource providing apparatus 17 does not need to inquire of the information processing apparatus 11 every time the access token included in the resource request is received from the client terminal 12 and verified. The information processing apparatus 11 receives no inquiries about the verification of the access token from the resource providing apparatus 17. This makes it possible for the information processing system 1it according to the second embodiment to reduce the load on both the information processing apparatus 11 and the resource providing apparatus 17, in addition to the above effects.

Furthermore, in the second embodiment, the resource providing apparatus 17 manages the access token. This can reduce the management load of the access token on the information processing apparatus 11 or reduce operation and management costs thereof.

Hardware Configuration

Figure 5:
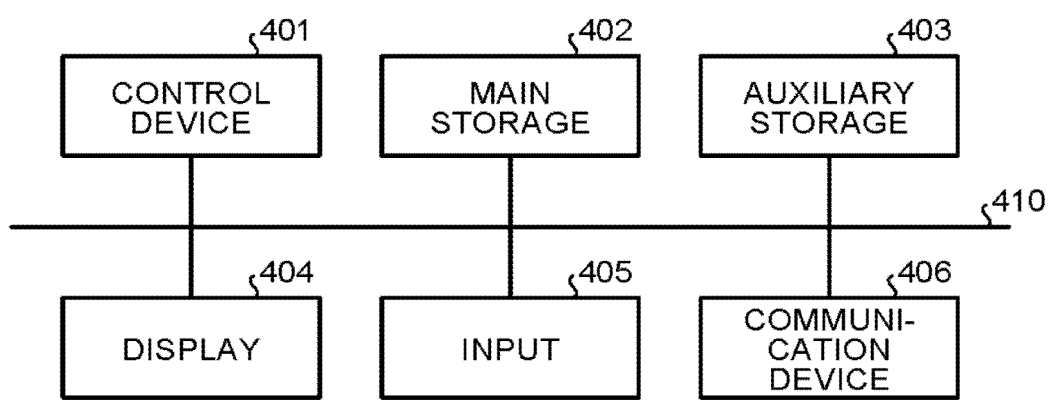
FIG. 5 is a diagram of a hardware configuration.

FIG. 5 is a diagram illustrating an exemplary hardware configuration of the main elements of the information processing apparatus 10, the information processing apparatus 11, the client terminal 12, the service providing apparatus 14, the resource providing apparatus 16, and the resource providing apparatus 17 according to the first r second embodiment. The information processing apparatus 10, the information processing apparatus 11, the client terminal 12, the service providing apparatus 14, the resource providing apparatus 16, and the resource providing apparatus 17 according to the first or second embodiment include a control device 401, a main storage 402, an auxiliary storage 403, a display 404, an input 405, and a communication device 406. The control device 401, the main storage 402, the auxiliary storage 403, the display 404, the input 405, and the communication device 406 are connected to one another through a bus 410.

The control device 401 reads a program from the auxiliary storage 403 to the main storage 402 and executes the program. The control device 401 represents a general-purpose processor such as a central processing unit (CPU). The main storage 402 represents a memory, such as a read only memory (ROM) and a random access memory (RAM). Examples of the auxiliary storage 403 include a memory card and a hard disk drive (HDD).

The display 404 displays information. The display 404 is, for example, a liquid crystal display. The input 405 receives information. Examples of the input 405 include a hardware key, a keyboard, and a mouse. The display 404 and the input 405 may be a liquid crystal touch panel including both a display function and an input function. The communication device 406 communicates with the other apparatuses and devices.

A program executed by the information processing apparatus 10, the information processing apparatus 11, the client terminal 12, the service providing apparatus 14, the resource providing apparatus 16, and the resource providing apparatus 17 according to the first or second embodiment is stored in an installable or executable file format in a computer-readable storage medium, such as a CD-ROM, a memory card, a CD-R, or a digital versatile disk (DVD), and is provided as a computer program product.

The program executed by the information processing apparatus 10, the information processing apparatus 11, the client terminal 12, the service providing apparatus 14, the resource providing apparatus 16, and the resource providing apparatus 17 according to the first or second embodiment may be stored in a computer connected to a network, such as the Internet, and downloaded and provided through the network. The program executed by the information processing apparatus 10, the information processing apparatus 11, the client terminal 12, the service providing apparatus 14, the resource providing apparatus 16, and the resource providing apparatus 17 according to the first or second embodiment may be provided through the network, such as the Internet, without being downloaded.

The program executed by the information processing apparatus 10, the information processing apparatus 11, the client terminal 12, the service providing apparatus 14, the resource providing apparatus 16, and the resource providing apparatus 17 according to the first or second embodiment may be incorporated into the ROM in advance.

The program executed by the information processing apparatus 10, the information processing apparatus 11, the client terminal 12, the service providing apparatus 14, the resource providing apparatus 16, and the resource providing apparatus 17 according to the first or second embodiment has a module configuration including functions implementable by the program among the functional configurations of each of the apparatuses.

The control device 401 reads and executes a program from a storage medium, such as the auxiliary storage 403, to thereby load the functions implementable by the program on the main storage 402. That is, the functions implementable by the program are generated in the main storage 402.

Part of the functions of the information processing apparatus 10, the information processing apparatus 11, the client terminal 12, the service providing apparatus 14, the resource providing apparatus 16, and the resource providing apparatus 17 according to the first or second embodiment may be implemented by hardware such as an IC.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that issues an access token in response to a token issuance request from a client, the apparatus comprising:
processing circuitry configured to:
receive the token issuance request from the client, the token issuance request including a nonce issued to the client, a first public key generated by the client, and a first signature for client information including the nonce;
transmit, to the client, a login request including first identification information of the token issuance request, when the first signature of the token issuance request is successfully verified, using the first public key; and
generate and issue a sender constrained token with the first public key as the access token, upon receipt of an authorization permission request from the client, the authorization permission request including the first identification information and authentication information of a user who uses the client.

2. The apparatus according to claim 1, wherein the first identification information transmitted by the processing circuitry includes the nonce, second identification information of the nonce, or communication session identification information of the token issuance request.

3. The apparatus according to claim 1, wherein the processing circuitry is further configured to transmit access-token response information to the client, the access-token response information including specific information of the issued access token.

4. The apparatus according to claim 3, wherein the specific information included in the access-token response information transmitted by the processing circuitry includes the issued access token or third identification information of the access token.

5. The apparatus according to claim 1, wherein the processing circuitry is further configured to append a second signature to the sender constrained token, using a certificate for certifying the issuance of the access token issued by the information processing apparatus, and issue the access token with the second signature.

6. The apparatus according to of claim 1, wherein upon receiving the token issuance request including third identification information of a resource providing apparatus to which a resource providing request is issued, the processing circuitry is further configured to determine whether the client being a transmission source of the token issuance request has a right to access the resource providing apparatus identified by the third identification information, and
upon determining that the client has the access right, the processing circuitry is further configured to issue the access token to be usable by the resource providing apparatus identified by the third identification information.

7. The apparatus according to claim 6, wherein the processing circuitry is further configured to transmit, to the resource providing apparatus identified by the third identification information, an access permission request from the client being the transmission source of the token issuance request.

8. The apparatus according to claim 6, wherein upon determining that the client has the access right, the processing circuitry is further configured to request the resource providing apparatus identified by the third identification information to generate the sender constrained token, using the first public key, and issue the sender constrained token generated by the resource providing apparatus as the access token.

9. The apparatus according to claim 8, wherein the processing circuitry is further configured to:
request the resource providing apparatus identified by the third identification information to append a third signature to the sender constrained token, using a certificate for certifying the issuance of the access token by the resource providing apparatus, and issue the sender constrained token with the third signature as the access token.

10. A computer program product comprising a non-transitory computer-readable medium including programmed instructions causing a computer to issue an access token in response to a token issuance request from a client, the instructions further causing the computer to execute:
- receiving the token issuance request from the client, the token issuance request including a nonce issued to the client, a first public key generated by the client, and a first signature for client information including the nonce;
- transmitting, to the client, a login request including first identification information of the token issuance request, when the first signature of the token issuance request is successfully verified, using the first public key; and
- generating and issuing a sender constrained token with the first public key as the access token, upon receipt of an authorization permission request from the client, the authorization permission request including the first identification information and authentication information of a user who uses the client.

* * * * *